(12) United States Patent
Takemura et al.

(10) Patent No.: US 6,541,574 B1
(45) Date of Patent: Apr. 1, 2003

(54) GOLF BALL WITH CORE AND SURROUNDING COVER, AND MANUFACTURING METHOD THEREOF

(75) Inventors: Kohei Takemura, Kobe (JP); Kazuhisa Fushihara, Kobe (JP); Seigou Sakagami, Kobe (JP); Kaname Yamada, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/573,685

(22) Filed: May 19, 2000

(30) Foreign Application Priority Data

May 20, 1999 (JP) .............................. 11-140502
Mar. 15, 2000 (JP) ....................... 2000-072806

(51) Int. Cl.⁷ .............................................. A63B 37/12
(52) U.S. Cl. ................... 525/332.7; 525/332.6; 473/365; 473/374; 473/377; 473/378
(58) Field of Search ........................... 525/322.6, 332.7; 473/365, 374, 377, 378

(56) References Cited

U.S. PATENT DOCUMENTS 1,524,428 A * 1/1925 Geer
5,037,104 A * 8/1991 Watanabe
5,255,922 A   10/1993 Proudfit

FOREIGN PATENT DOCUMENTS

JP   A5499177   8/1979
JP   A654928    3/1994

* cited by examiner

*Primary Examiner*—David J. Buttner
(74) *Attorney, Agent, or Firm*—Birch, Stewart, Kolasch & Birch, LLP

(57) ABSTRACT

A core is enveloped by a cover with trans 1,4-polyisoprene as the main component, including a super accelerator formed of dithiocarbamate and/or xanthate, and vulcanized at a temperature lower than the melting point of trans 1,4-polyisoprene to provide a golf ball having high impact resilience and spinning performance. Also, a core is enveloped by an inner layer cover having trans 1,4-polyisoprene as the main component, including a super accelerator formed of dithiocarbamate and/or xanthate, and the inner layer cover is surrounded by an outer layer cover with trans 1,4-polyisoprene as the main component, including a super accelerator of an amount larger than that in the inner layer cover to provide a golf ball having high impact resilience and spinning performance, and whose cover material is sufficiently anchored.

19 Claims, No Drawings

GOLF BALL WITH CORE AND SURROUNDING COVER, AND MANUFACTURING METHOD THEREOF

BACKGROUND OF THE INVENTION

FIELD OF THE INVENTION

The present invention relates to a golf ball with a core and a cover surrounding the core, particularly to a golf ball superior in spinning performance and impact resilience. In more detail, the present invention relates to a golf ball having high impact resilience and one which is relatively resistant to exhibiting a flier shot even when played from the rough. The present invention also relates to a method of manufacturing such a golf ball.

Conventionally, solid golf balls having a core with polybutadiene rubber as the base material surrounded by a cover resin and thread-wound golf balls having rubber thread wound around a core and enveloped by a cover resin such as ionomer are widely used in tournament matches.

During play, the golf ball often sinks deeply into the grass or rough of the fairway. A shot from the rough will often produce a flier type shot, i.e., the phenomenon whereby the ball is lifted very high due to a decrease of the backspin caused by the presence of grass between the club and the ball when the ball is struck. This flier yields unsatisfactory control, particularly at the time of an approach shot.

This phenomenon is encountered in both solid golf balls and thread-wound golf balls. Particularly, the aforementioned golf ball which has the ionomer resin cover experiences the disadvantage that a spin cannot be easily applied to the golf ball, leading to a degradation in controllability, although it still maintains good impact resilience due to the high elastic modulus.

It is said that a golf ball with a balata cover, i.e., a trans 1,4-polyisoprene cover is relatively resistant to a flier shot and superior in spin control. This is due to its appropriate hardness and high spinning performance due to the crystalline polymer portion and the crosslinking rubber portion of the golf ball.

In the case where crosslinking is effected at a temperature higher than the melting point of trans 1,4-polyisoprene (50° C.–60° C.), the crystalline portion will not be formed, even if cooling is effected after crosslinking. As a result, appropriate hardness cannot be obtained.

Therefore, it was conventionally necessary to carry out vulcanization over a long period of time under special ambience.

Japanese Patent Laying-Open No. 54-99177, for example, discloses the art of effecting a crosslinking reaction by immersing a golf ball in a xanthate type super vulcanization accelerator solution. However, there are many problems in the manufacturing step since immersion in the solution renders the post-process difficult.

Also, Japanese Patent Laying-Open No. 6-54928 discloses a method of crosslinking balata with a metal salt of an unsaturated fatty acid and a crosslinking initiator. This method has the disadvantage that the core enveloped by the cover is degraded due to the heat generated during the reaction. Also, an appropriate hardness could not be obtained since the crystal growth is not effected. Furthermore, if an accelerator for vulcanization such as the generally-used sulfur is employed, a vulcanization temperature of at least 120° C. is required. In this case, the desired hardness cannot be obtained since crystal growth is not achieved.

SUMMARY OF THE INVENTION

The present invention is directed to solving the above problems, and accordingly it is an object of the present invention to provide a golf ball improved in spinning performance and impact resilience, and a method of manufacturing such a golf ball.

According to one aspect of the present invention, a golf ball is provided having a core enveloped by a cover with trans 1,4-polyisoprene as the main component, including a super accelerator formed of dithiocarbamate and/or xanthate. The golf ball is vulcanized at a temperature lower than the melting point of trans 1,4-polyisoprene.

According to another aspect of the present invention, a golf ball is provided having a core enveloped by an inner layer cover and an outer layer cover. The inner layer cover, which envelopes the core, has trans 1,4-polyisoprene as the main component, and includes a super accelerator formed of dithiocarbamate and/or xanthate. The outer layer cover, which envelopes the inner layer cover, has trans 1,4-polyisoprene as the main component and includes a super accelerator of an amount larger than the amount in the inner layer cover.

According to a further aspect of the present invention, a golf ball is provided having a super accelerator formed of dithiocarbamate and/or xanthate.

According to still another aspect of the present invention, a golf ball is provided including an inner layer cover and an outer layer cover vulcanized at a temperature lower than the melting point of trans 1,4-polyisoprene.

According to a still further aspect of the present invention, a golf ball is provided including an outer layer cover and an inner layer cover having the ratio (W0/W1) of the thickness of the outer layer cover (W0) to the thickness of the inner layer cover (W1) in the range of 0.1–10.

According to yet a further aspect of the present invention, a golf ball is provided having a core which is a thread-wound core.

According to yet another aspect of the present invention, a method of manufacturing a golf ball including a core having a solid or thread-wound structure and a cover enveloping the core is provided, including the steps of blending a super accelerator for low temperature vulcanization in a polymer component with trans 1,4-polyisoprene as the main component to prepare a composition for the cover, molding the cover composition into a half shell, disposing a core enveloped by the half shell in a mold and forming dimple patterns at the surface of the cover composition, and vulcanizing the cover composition at a temperature lower than the melting point of trans 1,4-polyisoprene.

According to yet a still further aspect of the present invention, a method of manufacturing a golf ball is provided having a super accelerator formed of dithiocarbamate and/or xanthate.

According to still another aspect of the present invention, a method of manufacturing a golf ball is provided having a vulcanization temperature of 30° C.–50° C.

According to still another aspect of the present invention, a method of manufacturing a golf ball is provided including the steps of blending a super accelerator for low temperature vulcanization in a polymer component mainly composed of trans 1,4-polyisoprene to prepare a composition for an inner layer cover, blending a super accelerator of an amount larger than the amount in the inner layer cover in a polymer component mainly composed of trans 1,4-polyisoprene to prepare a composition for an outer layer cover, molding the inner layer cover composition into an inner half shell, molding the outer layer cover composition into an outer half shell, disposing a core enveloped by the outer layer half shell and the inner layer half shell in a mold, forming dimple patterns at the surface of the outer layer cover composition, and vulcanizing the inner layer cover composition and outer layer cover composition at a temperature lower than the melting point of trans 1,4-polyisoprene.

According to an additional aspect of the present invention, a method of manufacturing a golf ball is provided utilizing a super accelerator formed of dithiocarbamate and/or xanthate.

According to yet another aspect of the present invention, a method of manufacturing a golf ball is provided having a vulcanization temperature of 20° C.–50° C.

The foregoing and other objects, features, aspects and advantages of the present invention will become more apparent from the following detailed description of the present invention.

DESCRIPTION OF THE PREFERRED EMBODIMENTS

In the present invention, the composition for the cover is mainly composed of trans 1,4-polyisoprene. Here, trans 1,4-polyisoprene refers to a component having at least 60 trans structures in the polymer molecule. If the number of trans structures is less than 60, the crystalline portion is so small that the melting point becomes too low to be able to satisfy the basic property as a cover. The other polymer used in the mixture of the cover material is preferably a resin, a rubber or a high impact resilient material having a partial crystalline structure such as a high styrene resin, high cis-polybutadiene, an ionomer resin, and the like. These polymers can be blended in the range of not more than 50% by weight, preferably not more than 25% by weight with respect to the polymer component of the cover material. If the amount of trans 1,4-polyisoprene contained therein is low, the spinning performance and controllability will be reduced.

The super accelerator used in the present invention is an accelerator that can have the reaction initiated at a temperature of 70° C. or below, preferably at approximately 30° C.

Dithiocarbamate and xanthate, for example, are known as super accelerators, and include the following compounds.

As dithiocarbamate, dimethyl*sodium dithiocarbamate, diethyl*sodium dithiocarbamate, di-n-butyl sodium dithiocarbamate, dimethyl*zinc dithiocarbamate, diethyl*zinc dithiocarbamate, di-n-butyl zinc carbamate, diamyl*zinc dithiocarbamate, dibenzyl*zinc dithiocarbamate, N-pentamethylene*zinc dithiocarbamate, methyl pentamethylene*pipecoline dithiocarbamate, pipecolin pipecolyldithiocarbamate, pentamethylene*dithiocarbamate and the like can be enumerated.

As xanthate, isopropyl*sodium xanthate, isopropyl zinc xanthate, butyl*zinc xanthate, and the like can be enumerated.

Examples of the ingredients of the cover composition employed in the present invention will be set forth in the following. In the case where resin and/or rubber other than trans 1,4-polyisoprene is employed, the composition can be formed of 5–20 parts by weight of natural rubber, 5–20 parts by weight of high styrene resin, 0–20 parts by weight of diene rubber, 1–10 parts by weight of zinc oxide, and 1–20 parts by weight of titanate oxide, with respect to 100 parts by weight of trans 1,4-polyisoprene. Additionally, fiber reinforced rubbers, fiber reinforced resins, inorganic single crystal components, weight adjusters, metal powder, metal oxide and the like can be appropriately mixed. An amount of 0.1–3 parts by weight of sulfur is also blended therein.

If the amount of sulfur is less than the above-specified range, vulcanization will not proceed sufficiently, so that sufficient strength for a golf ball cover cannot be obtained. If the amount of sulfur is less than the above-specified range, vulcanization will occur during mixture of the material by the roll or kneader. Therefore, the amount of sulfur is preferably 0.1–3 parts by weight, particularly 0.2–2 parts by weight.

The thickness of the cover is preferably in the range of 0.5–4.0 mm, particularly in the range of 0.8–3.0 mm. If the cover thickness is less than 0.5 mm, durability will be degraded. If the cover thickness exceeds 4.0 mm, the volume ratio of the cover component to the entire ball is increased to degrade that impact resilience of the golf ball.

In the case where the cover includes an inner layer cover and an outer layer cover, the entire thickness of the inner layer cover and outer layer cover is preferably in the range of 0.5–4.0 mm, particularly in the range of 0.8–3.0 mm. Also, the ratio (W0/W1) of the thickness of the outer layer cover (W0) to the thickness of the inner layer cover (W1) is in the range of 0.1–10, preferably in the range of 1–10. If W0/W1 exceeds 10, the anchor effect of the core by the inner layer cover cannot be expected. If W0/W1 is smaller than 0.1, vulcanization may be insufficient to degrade the basic property of the cover.

The super accelerator is blended 0.1–3.0 parts, preferably 0.2–2.0 parts, further preferably 0.5–2.0 parts, with respect to the polymer component of 100 parts of the cover composition. If the amount of the super accelerator is less than the above-specified range, vulcanization will not proceed sufficiently, so that sufficient strength for the golf ball cover cannot be obtained. When the amount of the super accelerator is greater than the above-specified range, vulcanization will occur during mixture of the material by the roll or kneader.

In the case where the cover includes an inner layer cover and an outer layer cover, the amount of the super accelerator (C1) blended in the polymer composition of the inner layer cover is less than the amount of the super accelerator (C2) in the polymer composition of the outer layer cover. The ratio thereof (C1/C2) is preferably in the range of 0.01–0.8, more preferably in the range of 0.1–0.6. If the ratio is lower than 0.01, the vulcanization reaction of the polymer composition of the inner layer cover will be insufficient. If the ratio is 1.0 or more, impregnation of the cover material in the core is so small that the anchor effect cannot be expected. The amount of the super accelerator blended in the polymer composition of the inner layer cover is 0.05–2.5 parts by weight, preferably 0.1–1.5 parts by weight with respect to 100 parts by weight of the polymer component. The amount of the super accelerator blended in the outer layer cover is 0.1–3.0 parts by weight, preferably 0.2–2.0 parts by weight.

A method of manufacturing a golf ball of the present invention is set forth in the following.

Mixing of the cover composition is carried out by a roll or kneader. Here, the appropriate temperature of the material is 50° C.–80° C. If the temperature is below 50° C., trans 1,4-polyisoprene will not melt, so that other materials cannot be mixed therewith. If the temperature exceeds 80° C., the reaction of the super accelerator will be initiated, causing crosslinking. The mixing time should be as short as possible. Specifically, 1–20 minutes is preferable depending upon the blended amount of the super accelerator. If the mixing time is shorter than the above-specified time, diffusion of the ingredient in the polymer composition is degraded. If the mixing time is longer than the above-specified time, an inappropriate crosslinking reaction will occur.

The foregoing cover composition can be used to envelope both a solid core or a thread-wound core. To provide the cover composition around the solid core or the thread-wound core, hemispherical half shells are produced in advance and press-formed over the core. In producing the half shell, it is desirable to carry out the process at a low temperature of 60° C.–90° C. so that the material can flow, followed by a rapid cooling process.

A dimple pattern is then formed at the surface of the ball with the core enveloped by the half shells. Here, it is preferable to carry out molding at the temperature of 60° C.–90° C., followed by a rapid cooling process.

At this current stage, vulcanization reaction has not yet occurred, or partial occurrence thereof is of a level that will not degrade the flow property of the material.

Then, the cover composition is vulcanized. This is carried out by the method of setting the press temperature to at least 30° C. and not more than 50° C., and completing the crosslinking reaction within the mold in 2–72 hours, or removing the cooled object from the mold after press-formation and completing the crosslinking reaction at a similar temperature and period of time in an oven. Here, the vulcanization temperature is preferably 30° C.–50° C. which is lower than the melting point of trans 1,4-polyisoprene. The time of vulcanization is approximately 2–72 hours, depending upon the amount and type of the ingredients of the super accelerator. The cover material of the resultant ball has the vulcanization reaction completely finished.

The above-described method is applicable to a multipiece core formed of one or more layers, or a core of a thread-wound structure having rubber thread wound around a solid center or a liquid center.

A solid core, for example, a solid core for a two piece ball, is produced as set forth in the following. With respect to 100 parts by weight of polybutadiene, a rubber composition including a total of 10–50 parts by weight of a crosslinking agent alone or of at least two types formed of α, β-monoethylenic unsaturated carboxylic acid such as acrylic acid or methacrylate or metal salt thereof and trimethylolpropane trimethacrylate polyfunctional monomer, 10–30 parts by weight of a filler such as zinc oxide or barium sulfate, 0.5–5 parts by weight of peroxide such as dicumyl peroxide, and, if necessary, 0.1–1 parts by weight of an antioxidant is heated and applied with pressure for 10–40 minutes at the temperature of 140° C.–170° C. using a press to form a spherical crosslink.

In contrast, a thread-wound core includes a center and a rubber thread layer formed by winding rubber thread in an elongated state around the center. The center may be a solid center composed of a vulcanized formation of a rubber composition, or a liquid center having water or liquid such as paste sealed in a center cover of vulcanized rubber. The solid center preferably has a diameter of 27–38 mm. If the diameter of the solid center is smaller than 27 mm, the shot angle becomes so small that the amount of spinning will increase. As a result, the flight distance cannot be increased. If the diameter of the solid center is greater than 38 mm, rubber thread cannot be wound sufficiently around due to limitation in the diameter of the golf ball. The thin rubber thread layer will degrade the impact resilience of the ball due to its insufficient repulsion. As a result, the flight distance cannot be increased. In the case where a liquid center is employed, the diameter is preferably 25–35 mm. If the diameter of the liquid center is smaller than 25 mm, the shot angle will become so small that the amount of spin increases. As a result, the flight distance cannot be increased. If the diameter of the liquid center is greater than 35 mm, the predetermined ball hardness cannot be readily obtained. Also, the rubber thread layer will become so thin that the impact resilience of the ball is degraded to suppress gain of a flight distance.

Rubber thread can be obtained by vulcanizing a rubber composition including a blend of an antioxidant, vulcanization accelerator, sulfur and the like with natural rubber or with blended rubber of natural rubber and synthetic polyisoprene.

The method of manufacturing a golf ball with a cover including an inner layer cover and an outer layer cover is set forth in the following.

Mixing the polymer composition of the inner layer cover and the outer layer cover is carried out as described above.

Then, the core is enveloped by the half shells of an inner layer cover and an outer layer cover that are molded in advance. Dimple patterns are formed at the surface of the ball in a mold. Here, it is preferable to carry out molding at the temperature of 60° C.–90° C., followed by rapid cooling. Formation of the half shell is desirably carried out at the low temperature of 60° C.–90° C., for example, where the polymer composition of the cover can flow, followed by rapid cooling.

At this current stage, the vulcanization reaction has not yet occurred, or partial occurrence thereof is of a level that does not degrade the flow property of the polymer composition.

Then, the polymer composition of the cover is vulcanized. The method is employed of setting the press temperature to at least 20° C. and not more than 50° C. and completing the vulcanization reaction in the mold in 5–80 hours, or removing the cooled object from the mold after press-formation to complete vulcanization at a similar temperature and period of time in an oven. Here, the vulcanization temperature is preferably 20° C.–50° C. which is a temperature lower than the melting point of trans 1,4-polyisoprene. The vulcanization period of time is approximately 5–80 hours, depending upon the amount and type of the ingredients of the super accelerator. The cover material of the output ball has the vulcanization reaction completely finished.

In addition to the above-described method of applying a molding process on a core enveloped by an inner layer cover and an outer layer cover, the method of enveloping the core by half shells of the inner layer cover to integrate the same in a mold to form an inner sphere, and then surrounding the same with the half shells of the outer layer cover for formation can be employed. Although the optimum conditions for molding can be selected for the inner layer cover and the outer layer cover, respectively, there is the undesirable step of removing the burr generated in the molding step of the inner layer cover, and then molding the outer layer cover.

The above-described method is applicable to the golf ball of both a solid core and thread-wound core.

The present invention will be described according to the following examples. Golf balls according to examples of the present invention and comparative examples are set forth in the following.

(1) Core Production

The following core composition was prepared and subjected to vulcanization for 30 minutes at 155° C. to obtain a core of 38.4 mm in diameter. The surface of the core was buffed to improve adherence with the cover material.

| | |
|---|---|
| BRO1 (Note 1) | 100 parts |
| Zinc acrylate | 25 parts |
| Zinc oxide | 21 parts |
| Dicumyl peroxide | 1 part |

(Note 1) BRO1 is polybutadiene with 98% of cis content available by JSR Corporation.

(2) Cover Composition

A golf ball was manufactured according to the steps set afterwards using Cover Compositions No. 1–No. 10 in the following Table 1. The cover of both the examples of the present invention and the comparative examples were adjusted to the thickness of 2.3 mm.

TABLE 1

| Cover material composition No. | 1 | 2 | 3 | 4 | 5 | 6 | 7 | 8 | 9 | 10 |
|---|---|---|---|---|---|---|---|---|---|---|
| TP-301 (Note 1) | 100 | 100 | 100 | 100 | 100 | 100 | 100 | 100 | 100 | 100 |
| TP-049 (Note 2) | | 15 | 15 | | | | | | | 15 |
| BR01 (Note 3) | | | | 15 | 15 | | | | | |
| Vestenamer 8012 (Note 4) | | | | | | 15 | 15 | 15 | | |
| Potassium titanate whisker (Note 5) | | | | | | | | 10 | | |
| Zinc oxide no.3 (Note 6) | 6 | 6 | 6 | 6 | 6 | 6 | 6 | 6 | 6 | 6 |
| Titanium oxide (Note 7) | 12 | 12 | 12 | 12 | 12 | 12 | 12 | 12 | 12 | 12 |
| Sulfur | 2 | 2 | 2 | 2 | 2 | 2 | 2 | 2 | 2 | 2 |
| Super accelerator D (Note 8) | 1 | 1 | | 1 | | 1 | | 1 | | |
| Super accelerator PPD (Note 9) | | | 1 | | 1 | | 1 | | | |
| Super accelerator Noccelar Z1X (Note 10) | | | | | | | | | | 1 |
| Accelerator M (Note 11) | 1 | 1 | 1 | 1 | 1 | 1 | 1 | 1 | 2 | 1 |

Details of the ingredients in Table 1 are set forth in the following.

Note 1) Kuraray Co., Ltd. Trans 1,4-polyisoprene (trans content at least 95%)

Note 2) Asahi Chemical Industry Co., Ltd. Trans 1,4-polybutadiene (trans content 93%)

Note 3) JSR Corporation High cis polybutadiene (cis content 98%)

Note 4) Hulz Co. Trans-octenemer

Note 5) Otsuka Chemical Co., Ltd. Tismo D

Note 6) Toho Zinc Co., Ltd.

Note 7) Ishihara Sangyo Kaisha, Ltd. A-100

Note 8) Ouchishinko Chemical Industrial Co., Ltd. Noccelar-P (Pipecolin Pipecolyldithiocarbamate)

Note 9) Ouchishinko Chemical Industrial Co., Ltd. Noccelar-PPD (Pentamethylenedithiocarbamic acid)

Note 10) Ouchishinko Chemical Industrial Co., Ltd. Noccelar-Z1X (Isopropyl xanthate)

Note 11) Ouchishinko Chemical Industrial Co., Ltd. Noccelar M (Mercaptobenzothiazole)

(3) Manufacture Step of Golf Ball

The above composition was mixed for 8 minutes at the roll temperature of 70° C. to prepare a mixture. Using this mixture, molding was effected for 30 seconds at 80° C. with a half shell mold, followed by cooling to 20° C. and shaping, producing a hemispherical half shell. The core was enveloped by two of these half shells, and then subjected to a molding process for 30 seconds at 80° C. with a dimpled mold, followed by a cooling step to obtain a dimpled golf ball.

Then, this ball was left for 8 hours in an oven set at the temperature of 50° C. to complete the vulcanization reaction.

The obtained golf ball had an outer diameter of 43.0 mm.

The physical properties of the golf ball were measured by the following aspects.

Crystallization

Measurement was carried out at the programming rate of 10° C./minutes with a thermal differential scanning calorimetry (DSC) to obtain the crystallization from the magnitude of the heat absorption peak appearing in the vicinity of 40° C.–80° C. The unit to indicate the heat quantity per 1 g sample is J/g.

Compression

The amount of deflect of the ball when a load of 10 kg to 130 kg was applied on the ball, represented in the unit of mm.

Coefficient of Restitution

An aluminum cylindrical object of 200 g in weight was collided against the golf ball at the speed of 35 m/s. The speed of the cylindrical object and the golf ball before and after the collision was measured. The coefficient of restitution of each golf ball was calculated from respective speed and weight. Measurement was carried out two times for each golf ball. The average of n=8 balls were calculated and set as the result of each golf ball. The values were indexed on the basis of Example 1 as 100.

Flier Testing

An SW club was attached to a true temper robot. The amount of spin when hit at the speed of 21 m/s was measured. Measurement was made under a wet condition where the ball and the club face were wetted by a spray to reproduce the condition promoting a flier shot. Measurement was also carried out under a dry condition, absent of wetting. The spin maintenance was obtained by the following equation Spin maintenance (%)=(spin amount under wet condition/spin amount under dry condition)×100

The value of the spin maintenance was indexed on the basis of Example 1 as 100. A flier shot is more suppressed as the value becomes larger.

(1) Core Production

The core composition set forth in the following were prepared and subjected to vulcanization for 30 minutes at 155° C. to obtain a solid core of 36.0 mm in diameter.

TABLE 2

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Cover ingredient | 1 | 2 | 3 | 4 | 5 | 6 | 7 | 8 | 1 | 10 |
| Vulcanization condition | Following molding, 50° C./8 hours (oven) | As left | As left | As left | As left | As left | As left | As left | 50° C./8 hours (press) | 50° C./8 hours (oven) |
| Crystallization (J/g) | 43.4 | 41.5 | 40.2 | 42.6 | 43.5 | 41.8 | 41.9 | 42.8 | 43.1 | 43.0 |
| Coefficient of restitution | 100 | 103 | 104 | 107 | 106 | 104 | 105 | 107 | 100 | 101 |
| Compression mm | 2.794 | 2.761 | 2.749 | 2.893 | 2.861 | 2.830 | 2.843 | 2.798 | 2.798 | 2.762 |
| Flier suppression | 100 | 94 | 92 | 98 | 100 | 95 | 95 | 98 | 100 | 99 |

TABLE 3

Comparative examples
(Abbreviated as Comp. example in heading)

|  | Comp. example 1 | Comp. example 2 | Comp. example 3 | Comp. example 4 | Comp. example 5 | Comp. example 6 | Comp. example 7 | Comp. example 8 | Comp. example 9 | Comp. example 10 | Comp. example 11 |
|---|---|---|---|---|---|---|---|---|---|---|---|
| Cover ingredient | 1 | 2 | 3 | 4 | 5 | 6 | 7 | 8 | 9 | 9 | 10 |
| Vulcanization condition | Following molding, 120° C./20 min. (press) | As left | As left | As left | As left | As left | As left | As left | 50° C./8 hours (oven) | 120° C./20 min. (press) | 120° C./20 min. (press) |
| Crystallization (J/g) | 22.0 | 21.8 | 21.7 | 23.9 | 23.1 | 22.6 | 22.5 | 22.0 | 20.9 | 21.5 | 22.4 |
| Coefficient of restitution | 92 | 93 | 93 | 96 | 94 | 92 | 90 | 92 | 82 | 85 | 91 |
| Compression mm | 2.925 | 2.910 | 2.915 | 2.952 | 2.963 | 2.941 | 2.945 | 2.920 | 3.184 | 3.102 | 2.901 |
| Flier suppression | 84 | 83 | 83 | 87 | 86 | 85 | 85 | 84 | 81 | 82 | 85 |

It is appreciated from Tables 2 and 3 that examples of the present invention having trans 1,4-polyisoprene vulcanized with a supper accelerator exhibits the maintenance of high crystallization, high coefficient of restitution, and flier suppression.

A golf ball of the present invention with the cover formed of an inner layer cover and an outer layer cover is set forth in the following.

Golf balls of examples of the present invention and comparative examples were manufactured by the following steps.

| | |
|---|---|
| BRO1 (Note 1) | 100 parts |
| Zinc acrylate | 25 parts |
| Zinc oxide | 21 parts |
| DCP | 1 parts |

Note 1): BRO1 is polybutadiene with cis content of 98% available from JSR Corporation.

Rubber thread of the mixture of 50/50 parts by weight of natural rubber/polyisoprene rubber was wound around the solid core to obtain a rubber thread core of 38.4 mm in diameter.

(2) Cover Composition

A golf ball was manufactured by the following steps using an outer layer cover of Cover Compositions No. 1–No. 10 and an inner layer cover of Cover Composition Nos.11–18 shown in the following Table 4. Golf balls of examples of the present invention and the comparative examples were adjusted to have a ball diameter of 43.0 mm with a cover thickness of 2.3 mm.

Using this polymer composition, a molding process was applied for 30 seconds at 80° C. with a half shell mold, followed by a cooling process to 20° C. and shaping to produce a hemispherical half shell. The core was enveloped by two half shells of the inner layer cover, and then enveloped by half shells of the outer layer cover. A molding process was applied for 30 seconds at 80° C. with a dimpled mold, followed by cooling to obtain a dimpled ball.

TABLE 4

| Cover material | Outer cover composition | | | | | | | | | | Inner cover composition | | | | | | | |
|---|---|---|---|---|---|---|---|---|---|---|---|---|---|---|---|---|---|---|
| composition No. | 1 | 2 | 3 | 4 | 5 | 6 | 7 | 8 | 9 | 10 | 11 | 12 | 13 | 14 | 15 | 16 | 17 | 18 |
| TP-301 Note 1 | 100 | 100 | 100 | 100 | 100 | 100 | 100 | 100 | 100 | 100 | 100 | | | | | | | |
| TP-049 Note 2 | | 15 | 15 | | | | | | | | | 15 | 15 | 15 | | | | |
| BR01 Note 3 | | | | 15 | 15 | | | | | | | | | | 15 | 15 | | |
| Vestenamer 8012 Note 4 | | | | | | 15 | 15 | 15 | | | | | | | | | 15 | 15 | 15 |
| Potassium titanate whisker Note 5 | | | | | | | | | 10 | | | | | | | | | |
| Zinc oxide no. 3 Note 6 | 6 | 6 | 6 | 6 | 6 | 6 | 6 | 6 | 6 | 6 | 6 | 6 | 6 | 6 | 6 | 6 | 6 | 6 |
| Titanium oxide Note 7 | 12 | 12 | 12 | 12 | 12 | 12 | 12 | 12 | 12 | 12 | 12 | 12 | 12 | 12 | 12 | 12 | 12 | 12 |
| Sulfur | 2 | 2 | 2 | 2 | 2 | 2 | 2 | 2 | 2 | 2 | 2 | 2 | 2 | 2 | 2 | 2 | 2 | 2 |
| Super accelerator D Note 8 | 1 | 1 | | 1 | | 1 | | 1 | | | 0.5 | 0.3 | | 0.5 | | 0.6 | | 0.8 |
| Super accelerator PPD Note 9 | | | 1 | | 1 | | 1 | | | | | | 0.4 | | 0.8 | | 0.1 | |
| Super accelerator Noccelar-Z1X Note 10 | | | | | | | | | | 1 | | | | | | | | |
| Accelerator M Note 11 | 1 | 1 | 1 | 1 | 1 | 1 | 1 | 1 | 2 | 1 | 0.5 | 0.5 | 0.4 | 0.3 | 0.5 | 0.6 | 0.1 | 0.8 |

The details of the ingredients in Table 4 are identical to those in Table 1.

(3) Molding Half Shell of Inner and Outer Layer Covers

The respective compositions of the inner layer cover and the outer layer cover were mixed for 8 minutes at the roll temperature of 70° C. to prepare a polymer composition.

(4) Vulcanization of Golf Ball

Then, the ball was left for 8–75 hours in an oven set to 23° C.–50° C. to complete the vulcanization reaction. The vulcanization conditions are shown in the following Tables 5 and 6.

TABLE 5

| Example | Outer cover composition No. | Inner cover composition No. | Outer cover/inner cover thickness ratio | Vulcanization condition (after molding) temperature/hour | Permeation (mm) | Coefficient of restitution | Flier suppression |
|---|---|---|---|---|---|---|---|
| 1 | 1 | 11 | 1 | 50° C./12 H | 35.2 | 100 | 100 |
| 2 | 2 | 12 | 2 | 50° C./15 H | 35.3 | 101 | 98 |
| 3 | 3 | 13 | 3 | 40° C./24 H | 35.6 | 103 | 96 |
| 4 | 4 | 14 | 0.5 | 40° C./18 H | 35.1 | 102 | 97 |
| 5 | 5 | 15 | 0.3 | 30° C./40 H | 35.2 | 101 | 99 |
| 6 | 6 | 16 | 8 | 30° C./40 H | 35.4 | 98 | 103 |
| 7 | 7 | 17 | 9 | 40° C./48 H | 34.9 | 101 | 96 |
| 8 | 8 | 18 | 0.12 | 23° C./48 H | 35.3 | 106 | 94 |
| 9 | 1 | 11 | 10 | 50° C./12 H | 35.5 | 103 | 95 |
| 10 | 2 | 12 | 0.1 | 23° C./75 H | 34.8 | 108 | 95 |
| 11 | 3 | 13 | 0.5 | 50° C./12 H | 35.1 | 103 | 98 |
| 12 | 4 | 14 | 5 | 30° C./30 H | 35.3 | 108 | 96 |

TABLE 6

| Comparative Example | Outer cover composition No. | Inner cover composition No. | Outer cover/inner cover thickness ratio | Vulcanization condition (after molding) temperature/hour | Permeation (mm) | Coefficient of restitution | Flier suppression |
|---|---|---|---|---|---|---|---|
| 1 | 1 | — | — | 50° C./8 H | 36.8 | 95 | 90 |
| 2 | 2 | — | — | 50° C./8 H | 37.3 | 97 | 86 |
| 3 | 3 | — | — | 50° C./8 H | 37.5 | 98 | 85 |
| 4 | 4 | — | — | 50° C./8 H | 37.0 | 100 | 89 |
| 5 | 5 | — | — | 50° C./8 H | 36.9 | 99 | 90 |
| 6 | 6 | — | — | 50° C./8 H | 37.4 | 97 | 87 |
| 7 | 7 | — | — | 50° C./8 H | 37.3 | 98 | 87 |
| 8 | 8 | — | — | 50° C./8 H | 36.9 | 100 | 89 |

The physical properties of the golf balls were measured as set forth in the following.

Coefficient of Restitution

Conditions of the experiments were identical to those of the previous section of [Coefficient of restitution].

Flier Testing

Conditions of the experiments were identical to those of the above section of [Flier testing].

Permeation Diameter

The inner layer cover and the outer layer cover were peeled off from the golf ball, so that some of the anchored cover material remained at the surface of the thread-wound core. The anchored cover material was gradually removed from the surface as the rubber thread of the thread-wound core was unwound. When the anchored cover material was reduced to three sites on the thread-wound core, the unwinding step was terminated. The core diameter was measured at three sites using calipers. The average of the three site values were taken as the permeation diameter. A smaller value indicates a greater permeation of the cover material.

It is appreciated from Tables 5 and 6 that examples of the present invention reduced in the amount of the super accelerator in the inner layer cover exhibited high coefficient of restitution and suppression of flier shot.

By virtue of using trans 1,4-polyisoprene for the cover composition and applying vulcanization at a low temperature with a super accelerator, appropriate hardness can be achieved due to the material of trans 1,4-polyisoprene and the crystalline structure. Thus, the impact resilience and spinning performance are further improved.

Since the cover is formed of an inner layer cover and an outer layer cover with the amount of the super accelerator in the cover composition of the inner layer cover set lower than that of the cover composition of the outer layer cover, and effecting vulcanization at a low temperature, a high coefficient of restitution and high spinning performance of the satisfactory level can be obtained. The cover material is closely adhered to the core to allow improvement of the anchor effect.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A golf ball comprising:
   a core,
   an inner layer cover enveloping the core, said inner layer cover containing a blend of trans 1,4-polyisoprene as a main component and a super accelerator selected from the group consisting of a dithiocarbamate, a xanthate, and mixtures thereof, and
   an outer layer cover enveloping the inner layer cover, said outer layer cover containing a blend of trans 1,4-polyisoprene as a main component and said super accelerator present in an amount larger than that included in said inner layer cover.

2. A The golf ball according to claim 1, wherein said inner layer cover and said outer layer cover are vulcanized at a temperature lower than the melting point of trans 1,4-polyisoprene.

3. The golf ball according to claim 1, wherein the ratio (W0/W1) of the thickness of said outer layer cover (W0) to the thickness of said inner layer cover (W1) is 0.1–10.

4. The golf ball according to claim 1, wherein said core is a thread-wound core.

5. The golf ball according to claim 1, wherein the entire thickness of the inner layer cover and outer layer cover is 0.5 to 4.0 mm.

6. The golf ball according to claim 1, wherein the super accelerator is present in an amount of 0.1 to 3.0 parts with respect to the polymer component of 100 parts of the cover composition.

7. The golf ball according to claim 1, wherein the ratio of the super accelerator (C1) blended in the composition of the inner layer relative to the super accelerator (C2) blended in the composition of the outer layer is C1/C2=0.01 to 0.8.

8. The golf ball according to claim 1, wherein the cover composition comprises 5 to 20 parts by weight of natural rubber, 5 to 20 parts by weight of styrene resin, 0 to 20 parts by weight of diene rubber, 1 to 10 parts by weight of zinc oxide and 1 to 20 parts by weight of titanate oxide per 100 parts by weight of trans 1,4-polyisoprene.

9. The golf ball according to claim 1, further containing 0.1 to 3 parts by weight of sulfide per 100 parts by weight of trans 1,4-polyisoprene.

10. The golf ball according to claim 1, wherein the super accelerator is present in the inner layer cover in an amount of 0.05 to 2.5 parts by weight and in the outer layer cover in an amount of 0.1 to 3.0 parts by weight with respect to 100 parts by weight of the polymer component, respectively.

11. The golf ball according to claim 1, wherein the trans 1,4-polyisoprene has at least 60 trans structures in the polymer molecule.

12. A method of manufacturing a golf ball including a core having a solid or thread-wound structure and a cover enveloping said core, said method comprising the steps of:

blending a super accelerator for low temperature vulcanization in a polymer component containing trans 1,4-polyisoprene as a main component to prepare a composition for the cover, molding the cover composition into a half shell, placing the core into said half shell, disposing said core enveloped by said half shell in a mold, and forming a dimple pattern on the surface of said cover, and vulcanizing the cover composite at a temperature lower than the melting point of trans 1,4-polyisoprene.

13. The method of manufacturing a golf ball according to claim 12, wherein said super accelerator includes a member selected from the group consisting of a dithiocarbamate, a xanthate, and mixtures thereof.

14. The method of manufacturing a golf ball according to claim 12, wherein the temperature of vulcanization is 30° C.–50° C.

15. The method according to claim 12, wherein the cover composition is mixed at a temperature of 50 to 80° C.

16. The method according to claim 12, wherein molding is carried out of a temperature of 60 to 90° C.

17. A method of manufacturing a golf ball comprising the steps of:

blending a super accelerator for low temperature vulcanization in a polymer component with trans 1,4-polyisoprene as a main component to prepare a composite for an inner layer cover, blending said super accelerator in an amount larger than the amount in said inner layer cover in a polymer component having trans 1,4-polyisoprene as a main component to prepare a composite for an outer layer cover, molding said inner layer cover composite into an inner layer half shell, molding said outer layer cover composite into an outer layer half shell, placing the core into said half shells, disposing a core enveloped by said outer layer half shell and said inner layer half shell in a mold, and forming a dimple pattern on the surface of the outer layer cover composite, and vulcanizing said inner layer cover composite and said outer layer cover composite at a temperature lower than the melting point of trans 1,4-polyisoprene.

18. The method of manufacturing a golf ball according to claim 17, wherein said super accelerator includes a member selected from the group consisting of a dithiocarbamate, a xanthate, and mixtures thereof.

19. The method of manufacturing a golf bail according to claimed 17, wherein the temperature of vulcanization is 20° C.–50° C.

* * * * *